United States Patent Office 3,167,766
Patented Jan. 26, 1965

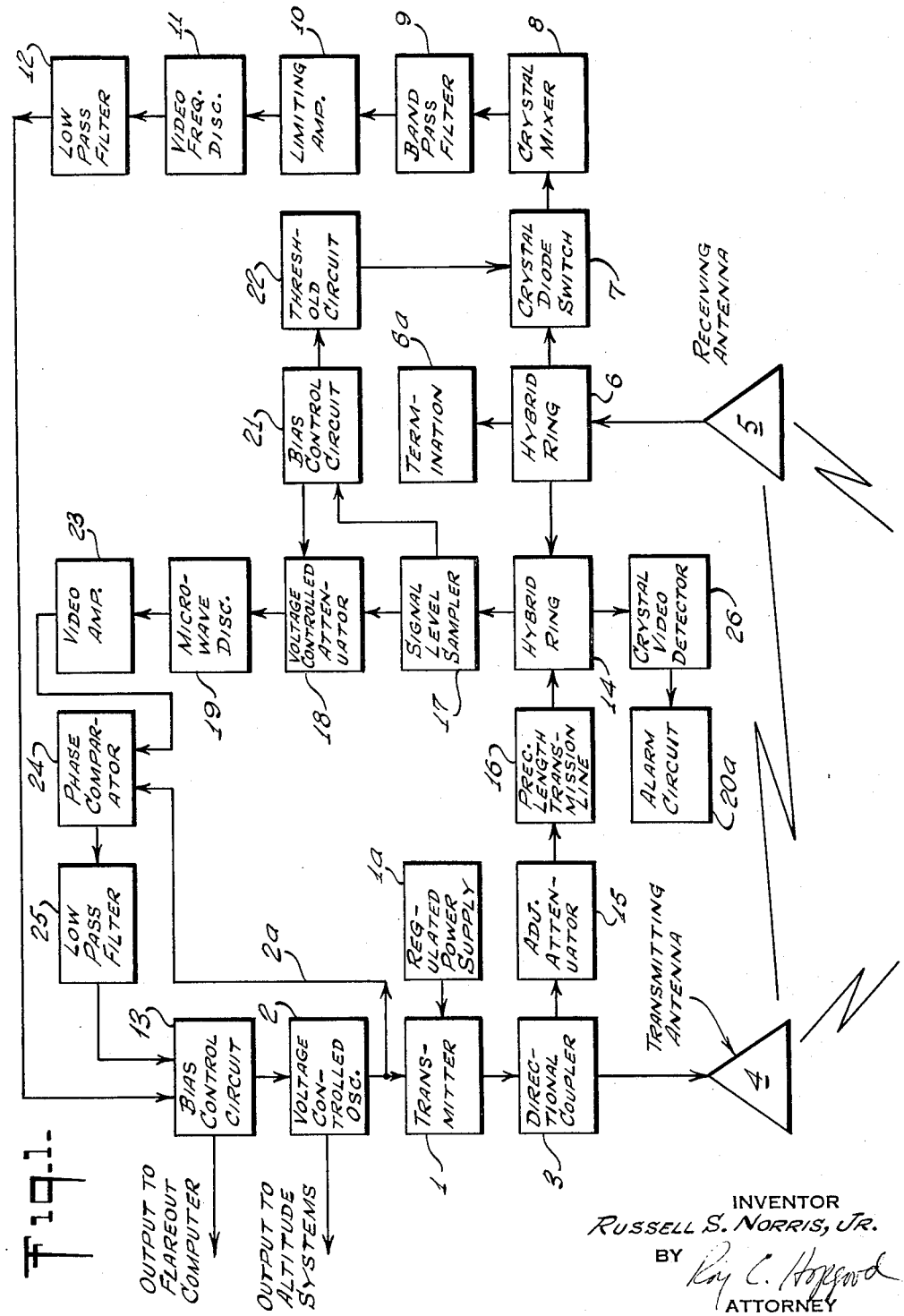

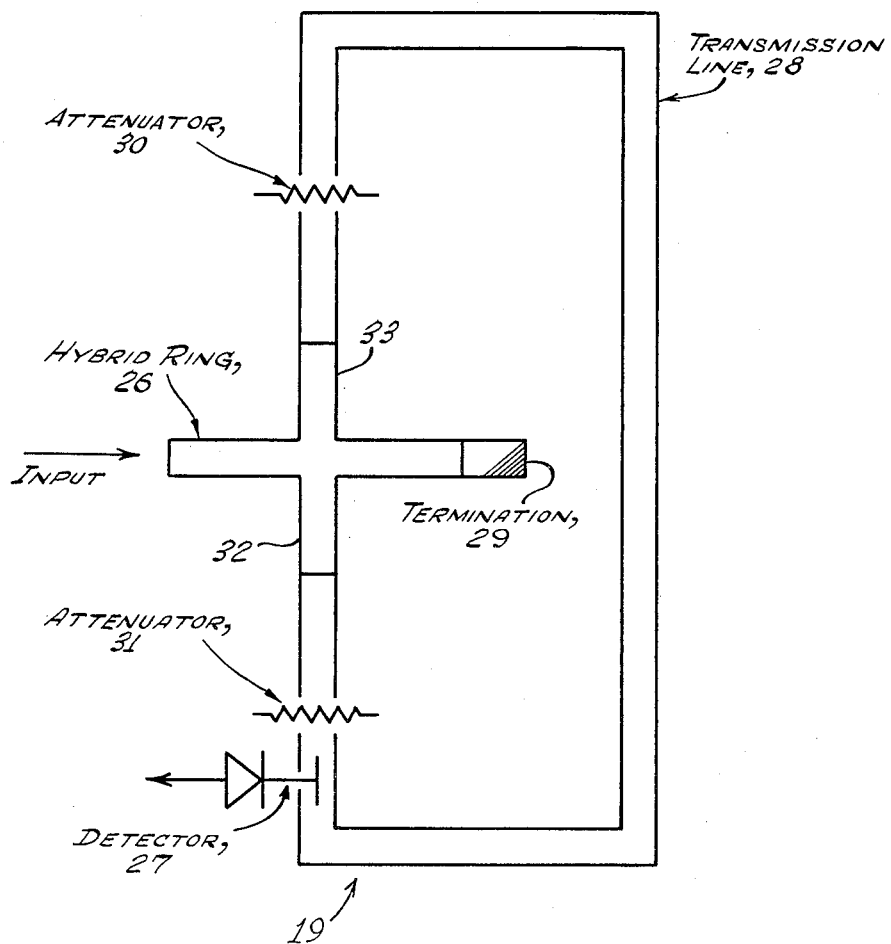

3,167,766
RADIO ALTIMETER SYSTEM
Russell Snyder Norris, Jr., State College, Pa., assignor to HRB-Singer, Inc., State College, Pa., a corporation of Pennsylvania
Filed Aug. 26, 1960, Ser. No. 52,270
8 Claims. (Cl. 343—14)

This invention relates to radio altimeter systems and more particularly to frequency modulated continuous wave radio altimeters for use in blind-landing systems.

A radio altimeter is basically a distance measuring system in which the transmitted energy is reflected by the terrain over which the mobile unit is disposed; the distance to the ground from the mobile unit being determined from the information contained in the received echo signal. In the past, one common radio altimeter system frequency modulated the carrier signal emitted by the transmitter. A receiver, mounted in the mobile unit, detected the FM echo signal return and compared it with a low amplitude sample signal derived over a direct path from the transmitter. Due to the longer path of the echo signal, a finite time delay occurs between the received echo signal and the direct path signal. Since the frequency of the transmitted waves are periodically varied in a known manner, the difference I-F frequency of the signals received over both paths is proportional to the rate of transmitter frequency change and to the path distance of the echo signal and thus may be used as an indication of the height of the mobile unit above the ground.

It has long been recognized that such a radio altimeter system inherently contains errors as a result of the method employed in varying the transmitter frequency, and also as a result of the quantizing characteristic of the use of an averaging frequency counter to determine the difference frequency. These errors result in ambiguities in the indicated altitudes for discrete increments of altitude. Theoretically such errors may be reduced to negligible proportions by increasing the limits of the carrier frequency deviation. However, from a practical point of view, such an arrangement is prohibitively wasteful of available frequency spectrum.

More recently a radio altimeter system, designed primarily as a terrain clarance indicator, was developed in which the carrier wave was frequency modulated in a nearly symmetrical manner. In that system, the peak-to-peak deviation of the carrier wave varies inversely with altitude, when the aircraft was above 200 feet, to maintain a nearly constant frequency difference between the received echo signal and the direct path signal. This known system provides the narrow band operation necessary for operations at high altitudes, but at altitudes below 200 feet the system contains a fixed error of about three and one half feet. Above 200 feet the fixed error varies with altitude due to the change in frequency deviation with altitude. As a terrain indicator the system is quite satisfactory but the fixed error at low altitudes severely limits its usefulness as an altimeter for use in blind-landing systems.

In order to achieve the precision required in aircraft blind-landing systems, it is important that the altimeter fixed errors be eliminated or be reduced to negligible proportions. The requirements for a low altitude and blind landing flareout altimeter system have been stated by the Blind Landing Experimental Unit of the British Royal Aircraft Establishment as the following: a low altitude accuracy of about two feet; a smooth height-derivative $(dh/dt)$ output for flareout computers; a response time to altitude changes of less than or equal to one tenth of a second; a linear output with altitude, and a zero drift of less than one foot under all conditions. In view of these requirements, it is obvious that the present known radio altimeter systems are unsatisfactory for use in blind-landing systems, and for this reason the present blind-landing systems generally utilize visual contact with the ground just prior to touchdown.

One of the objects of this invention, therefore, is to provide a radio altimeter system meeting the requirements set forth above for use in a blind-landing system.

Another object of this invention is to provide a radio altimeter system utilizing overlapping modes of operation.

A further object of this invention is to provide a radio altimeter system utilizing a signal which may be continuously monitored from the ground to provide an indication of the height of the aircraft.

One of the features of this invention is the provision of an FM-CW radio altimeter system for use in blind-landing systems, in which two overlapping feedback modes of operation are incorporated, both automatically controlled, to eliminate fixed or step errors at low altitudes. The feedback path in each mode of operation is used automatically to control the modulation frequency such that the modulation frequency of the transmitted signal is inversely proportional to the aircraft altitude. This permits ground detection and demodulation of the transmitted signal to obtain an indication of the aircraft height.

Another feature of this invention is the provision of a unique microwave discriminator for use in conjunction with the radio altimeter system.

These and other features and objects of this invention will become more apparent by reference to the following description taken in conjunction with the accompanying drawing, in which:

FIG. 1 is a simplified block diagram of the radio altimeter of this invention;

FIG. 2 is a schematic diagram of a novel microwave discriminator for use in the radio altimeter of this invention.

Referring to FIG. 1, the novel radio altimeter system for use in blind-landing systems, comprises a continuous wave transmitter 1, powered by a regulated power supply 1a, and frequency modulated by the output of a voltage-controlled variable frequency oscillator 2. The output of the transmitter 1 is coupled through a directional coupler 3 to a transmitting antenna 4. The directional coupler 3 permits the majority of the radio frequency power developed by transmitter 1 to be delivered to the transmitting antenna 4.

The modulated transmitter signal is radiated by the transmitting antenna 4 toward the ground where it is reflected. A portion of the ground reflected signal is incident on the receiving antenna 5. The physical mounting of the transmitting and receiving antennas 4–5 is arranged to enable a controlled level of the transmitted signal to be coupled directly to the receiving antenna 5.

The receiving antenna 5 is coupled to a hybrid-ring 6, having a termination 6a in one branch. The ring 6 serves to divide the received power equally into two isolated channels. The signal provided by each channel of the hybrid 6 consists of the ground-return and direct-leakage signals.

One output from hybrid-ring 6 is coupled through a crystal diode microwave switch 7 to a crystal mixer 8. The ground-return signal and the controlled leakage signal are operated on by the non-linear properties of the crystal mixer 8 to produce a signal representing the difference frequency between the controlled leakage signal and ground return signal. This difference frequency signal is dependent on the original modulating frequency, the frequency deviation produced by the modulating signal and the delay time of the ground return signal with respect to the transmitting signal. The difference frequency signal produced by crystal mixer 8 is coupled to a band-pass filter 9 to remove low frequency noise and high frequency mixing products. The filtered output from band-pass filter 9 is coupled to limiting amplifier 10 which serves to reduce amplitude fluctuations resulting from varying ground reflectivity and other causes. The filtered, limited signal from limiting amplifier 10 is then applied to a frequency discriminator 11 which has a center frequency and an approximately logarithmic frequency characteristic. The output from discriminator 11 is filtered by low pass filter 12 and coupled to the bias control circuit 13. The output of the bias control circuit 13 comprises a D.C. control voltage which is applied as the input to the voltage controlled variable frequency oscillator 2 to vary its frequency.

In addition, the bias-control circuit 13 provides an analog voltage output which can be utilized by an ancillary computer or other equipment. Thus, this portion of the radio altimeter system of this invention represents a closed loop arrangement for automatic frequency control in which the aircraft altitude (distance of the ground return signal path), modulation frequency and difference frequency are the variables.

The automatic frequency control loop functions to maintain a constant frequency difference (frequency tracker) between the direct and ground return signals by controlling the frequency of the modulation energy. The modulation frequency is inversely proportional to altitude. The automatic frequency control loop portion of the radio altimeter system of this invention can satisfactorily operate from less than 50 to more than 1000 foot altitudes. Moreover, it is apparent that either the modulation frequency or the D.C. control voltage can be utilized to provide an indication of altitude rather than using the difference frequency as in the prior art systems.

In the second operating mode the radio altimeter of this invention compares the phase of the recovered modulation waveform of the ground return signal against the phase of the transmitter modulating waveform in a closed loop which acts to maintain a constant phase difference between the two waveforms. The use of a single receiving antenna for both modes of operation requires for the automatic frequency control mode (previously described) a significant level of direct leakage signal at the receiving antenna. In the automatic phase control mode to be described, it is necessary, however, to suppress the direct leakage signal below the automatic phase control system detection threshold.

Again referring to FIG. 1, the second output terminal of hybrid ring 6 is coupled to one input of a second hybrid ring 14. A sample of the transmitter signal derived from directional coupler 3 is coupled through an adjustable attenuator 15 and a precision length of transmission line 16 to the second input terminal of hybrid ring 14. In the absence of any ground return signal, attenuator 15 is adjusted to equate the amplitude of the transmitter signal sample, derived from directional coupler 3, to the amplitude of the direct leakage signal.

Hybrid ring couplers provide a resulting voltage level at one output terminal representing the sum of the two input signals, and a voltage level at the other output terminal representing the difference between the two input signals if a zero or 180 degree phase difference exists between the two signal sources, having the same frequency, applied to the two input terminals. This is accomplished by the precision transmission line 16 which delays the phase of the transmitter signal sample sufficiently to achieve the desired 180 degree phase relation with respect to the direct leakage signal. Thus, at one output terminal of hybrid ring 14, the direct leakage signal is effectively cancelled, while at the other output terminal the sum of the direct leakage and transmitter sample signals appears.

In the presence of a reflecting ground therefore, only the ground-return signal appears at one output terminal of the hybrid ring 14. This output terminal is coupled through a signal-level sampler 17 consisting of a directional coupler and video detector, to a crystal-diode, voltage-variable, microwave attenuator 18, and then to a microwave discriminator 19. The opposite output terminal of hybrid ring 14, at which the sum of the transmitter sample and direct leakage signals appears, is coupled to a video detector 20. The detected signal output from video detector 20 is applied to an alarm system 20a which indicates failure of the transmitter.

The output of the signal-level sampler 17 also is coupled to a bias control circuit 21 and to a threshold circuit 22. At some altitude between 0 and 50 feet, the ground return signal amplitude is above the detection threshold of signal-level sampler 17 and microwave discriminator 19 (comparable sensitivities). As the ground return signal increases in amplitude due to decreasing altitude, the signal developed at the output of signal-level sampler 17 is sufficient to initiate a switching action in threshold circuit 22, which in turn causes the diode microwave switch 7 to open, deactivating the automatic frequency control loop. The detected output signal from the signal-level sampler 17 also controls the bias voltage from the bias control circuit 21, applied to the voltage-variable microwave attenuator 18, to provide a degree of limiting of the ground return signal prior to FM demodulation by the microwave discriminator. Limiting of the ground return signal is desirable in order to minimize variations in the microwave discriminator output due to varying ground reflectivity.

Referring to FIG. 2 of the drawing the unique microwave discriminator 19 for use in the radio altimeter of this invention is comprised of a hybrid ring 26, a detector 27, and a predetermined length of transmission line 28. The frequency modulated microwave signal from the voltage-variable, microwave attenuator 18 is coupled to the input terminal of the hybrid ring 26. The input signal is split into two equal components, traveling in opposite directions through the closed loop transmission line 28.

In accordance with well known principles, the hybrid ring may include in one branch 29 the usual termination, and the transmission line 28 may also include the usual attenuators 30 and 31. The detector 27 is disposed adjacent to one arm 32 of the hybrid ring and the predetermined length of transmission line 28 couples the opposite end of the detector 27 to the opposite hybrid ring arm 33. The output of the detector 27 contains the original modulating signal plus noise components.

Returning now to FIG. 1, the output of the discriminator 19 is coupled to the phase compensating video amplifier 23 and then to a phase comparator 24. The reference signal input for the phase comparator 24 is obtained from the output of the voltage-controlled, variable frequency oscillator 2 over line 2a. The output of the phase comparator 24 represents the difference in phase between the transmitter modulation signal from oscillator 2 and the ground return signal. This output is coupled to a low pass filter 25 and then to the bias control circuit 13 which has been described.

Thus, in this last described mode of operation it is apparent that the closed loop represents an automatic phase control servo in contrast to the first loop which operated as an automatic frequency control loop. By proper selection of the loop constants the output of the low pass filter can be made identical to the output of the low pass filter 12 in the overlap region of operation where both modes of operation are functioning. The overlap range of operation depends on the sensitivity of the signal-level sampler and microwave discriminator as well as the threshold setting of threshold circuit 22. When the threshold circuit is triggered by the output from signal-level sampler 17 and the diode microwave switch 7 is open, the output of the radio altimeter is entirely dependent upon the automatic phase control loop. Since the automatic phase control loop has no inherent limitations, such as fixed error in the altitude range up to greater than 50 feet, the altitude measurement is achieved with improved accuracy. As in the automatic frequency control mode, the modulation frequency is inversely proportional to altitude. The overlap range provides for continuity of operation between the two modes.

In order to ground monitor the altitude of an aircraft equipped with the radio altimeter of this invention, see FIG. 3, a series of receiving antennas 35, 36, 37 and 38, each equipped with the microwave discriminator heretofore described, are spaced along the approach path of the aircraft. The video signal derived from each antenna may be transmitted to a control location where the frequency can be converted to an altitude reading.

While I have described above the principles of my invention in connection with specific apparatus, it is to be clearly understood that this description is made only by way of example and not as a limitation to the scope of my invention as set forth in the objects thereof and in the accompanying claims.

I claim:

1. A distance measuring system comprising a transmitter for transmitting frequency modulated waves over a transmission path of unknown distance, a source of modulation signals, means coupling said modulation signals to modulate the output of said transmitter, a receiver adapted to receive the direct and the echo of said transmitted signals, transmission line means between said transmitter and said receiver for coupling a signal from said transmitter to said receiver which is approximately 180° out of phase with said direct signal, said receiver including means to detect the modulation signal in said received echo signal, a phase comparator coupled to receive the output from said detector means, means coupling a reference signal from said source to said comparator to thereby allow said comparator to compare the phase of said detected signal and the modulation signal coupled to said receiver, means responsive to said phase comparison to develop a control signal, means coupling said control signal to said modulation signal source to vary the output of said source to maintain a constant phase difference between said detected signal and said modulation signal.

2. A system according to claim 1 wherein said means to detect the modulation signal in said received echo signal includes a microwave discriminator having a hybrid ring coupler including an input section, an opposed terminating section and a pair of ports at right angles to said input and terminating sections, a transmission line crystal detector coupled to one of said ports and a transmission line coupled between the other port and said crystal detector.

3. A system according to claim 1 which further includes an automatic frequency control loop, said loop including means for mixing said direct and said echo signals coupled to said receiver to thereby produce a difference frequency, means for converting said difference frequency to a bias control signal, and means coupling said control signal to said modulation signal source to maintain a constant frequency difference between said detected signal and said modulation signal.

4. A system according to claim 3 which further includes means responsive to the amplitude of said received echo signal to disable said mixing means.

5. A system according to claim 3 and further comprising means for operating said phase comparison only when said received echo signal exceeds a predetermined level.

6. A distance measuring system comprising
a transmitter for transmitting frequency modulated waves over a transmission path of unknown distance,
a source of modulation signals,
means coupling said modulation signals to modulate the output of said transmitter,
a receiver adapted to receive the direct and the echo signals of said transmitted signal
transmission line means between said transmitter and said reeciver for coupling a signal from said transmitter to said receiver which is approximately 180° out of phase with said direct signal,
said receiver including means for separating said echo signal from said direct signal,
said receiver further including means to detect the modulation signal in said received echo signal,
a phase comparator coupled to receive the output from said detector means,
means coupling a reference signal from said source to said comparator to thereby allow said comparator to compare the phase of said detected signal and the modulation signal coupled to said receiver,
means responsive to said phase comparison to develop a control signal,
and means coupling said control signal to said modulation signal source to vary the output of said source to maintain a constant phase difference between said detected signal and said modulation signal.

7. A distance measuring system comprising
a transmitter for transmitting frequency modulated waves over a transmission path of unknown distance,
a source of modulation signals,
means coupling said modulation signals to modulate the output of said transmitter,
a receiver adapted to receive the direct and the echo signals of said transmitted signal,
transmission line means between said transmitter and said receiver for coupling a signal from said transmitter to said receiver which is approximately 180° out of phase with said direct signal,
said receiver including means for receiving said 180° out of phase signal at one input terminal and said direct echo signals at another input terminal to thereby produce only said echo signal at an output terminal thereof,
said receiver further including means to detect the modulation signal in said received echo signal,
a phase comparator coupled to receive the output from said detector means,
means coupling a reference signal from said source to said comparator to thereby allow said comparator to compare the phase of said detected signal and the modulation signal coupled to said receiver,
means responsive to said phase comparison to develop a control signal,
and means coupling said control signal to said modulation signal source to vary the output of said source to maintain a constant phase difference between said detected signal and said modulation signal.

8. A system according to claim 7 wherein said means for receiving said 180° out of phase signal comprises a hybrid ring.

References Cited in the file of this patent

UNITED STATES PATENTS

| 2,498,933 | Wallace | Feb. 28, 1950 |
| 2,520,553 | Lawson | Aug. 29, 1950 |
| 2,537,593 | Landon | Jan. 9, 1951 |
| 2,736,891 | Munster | Feb. 28, 1956 |
| 2,825,056 | Rust | Feb. 25, 1958 |
| 3,026,515 | Rey | Mar. 20, 1962 |
| 3,065,465 | Wimberly | Nov. 20, 1962 |

FOREIGN PATENTS

| 1,026,343 | France | Apr. 27, 1953 |